(12) United States Patent
Schroder et al.

(10) Patent No.: US 9,386,166 B2
(45) Date of Patent: Jul. 5, 2016

(54) METHOD AND DEVICE FOR STARTING LIMITED-TIME LICENSES FOR TELECOMMUNICATION SYSTEMS IN A CONTROLLED MANNER

(71) Applicant: Unify GmbH & Co. KG, Munich (DE)

(72) Inventors: Simone Schroder, Dortmund (DE); Martin Gerst, Schwerte (DE); Ingo Kalms, Mulheim (DE)

(73) Assignee: Unify GmbH & Co. KG, Munich (DE)

( * ) Notice: Subject to any disclaimer, the term of this patent is extended or adjusted under 35 U.S.C. 154(b) by 154 days.

(21) Appl. No.: 14/342,473

(22) PCT Filed: Mar. 1, 2013

(86) PCT No.: PCT/EP2013/000606
§ 371 (c)(1),
(2) Date: Mar. 3, 2014

(87) PCT Pub. No.: WO2013/127537
PCT Pub. Date: Sep. 6, 2013

(65) Prior Publication Data
US 2014/0241343 A1    Aug. 28, 2014

Related U.S. Application Data

(63) Continuation of application No. PCT/EP2012/000958, filed on Mar. 2, 2012.

(51) Int. Cl.
*H04M 15/00* (2006.01)
*H04L 12/24* (2006.01)
*G06F 21/10* (2013.01)

(52) U.S. Cl.
CPC ............. *H04M 15/88* (2013.01); *G06F 21/10* (2013.01); *H04L 41/0896* (2013.01); *H04M 15/56* (2013.01)

(58) Field of Classification Search
CPC ....... H04M 15/88; H04M 15/56; G06F 21/10; H04L 41/0896
USPC .................. 370/351, 352, 389, 395.1, 395.2, 370/395.21, 464, 465, 468; 705/50, 51, 59, 705/52; 726/26, 27
See application file for complete search history.

(56) References Cited

U.S. PATENT DOCUMENTS 5,204,897 A        4/1993  Wyman
2003/0084306 A1*  5/2003  Abburi et al. ................. 713/188
(Continued)

OTHER PUBLICATIONS

International Preliminary Report on Patentability for PCT/EP2013/000606 dated Sep. 12, 2014 (Form PCT/ISA/373) (English Translation).

(Continued)

*Primary Examiner* — Obaidul Huq
(74) *Attorney, Agent, or Firm* — Buchanan Ingersoll & Rooney PC

(57) ABSTRACT

A method and a device for starting limited-time licenses for a telecommunication system in a controlled manner in which the system comprises a number of IP terminals. The licenses acquired by the respective customer for the telecommunication system are downloaded from a central license server via a network such as the internet. A date and a time, and thus an activation time period, are configured via a browser dialog using the web-based management component which is connected to the network (e.g. the Internet) for the purpose of an activation the first time the telecommunication system is started, whereby the maximally allowed use time for using the licenses at no charge is set. After the maximally allowed use time expires, the use of those licenses for which no right of use has been acquired is prohibited

20 Claims, 5 Drawing Sheets

(56) References Cited

U.S. PATENT DOCUMENTS

2005/0256805 A1* 11/2005 Satkunanathan et al. ....... 705/59
2010/0262963 A1 10/2010 Wassermann et al.
2011/0072268 A1* 3/2011 Yamagishi et al. ........... 713/171

OTHER PUBLICATIONS

International Preliminary Report on Patentability for PCT/EP2013/000606 dated Sep. 12, 2014 (Form PCT/ISA/373) (German Translation).
Written Opinion of the International Searching Authority for PCT/EP2013/000606 dated May 24, 2013 (Form PCT/ISA/237) (German Translation).
International Search Report for PCT/EP2013/000606 dated May 24, 2013 (Forms PCT/ISA/220, PCT/ISA/210) (German Translation).
Siemens Enterprise Communications, Hofmannstr. 51, D-80200 Munich, May 2010, "Getting Started, OpenScape Office MX, 2nd Edition," Reference No. A31003-P1020-G 100-2-31, 4 pages.
Siemens Enterprise Communications, Hofmannstr. 51, D-80200 Munich: "OpenScape Office MX (de)," pp. 1-5, (version dated: Feb. 29, 2012).
Siemens Enterprise Communications, Hofmannstr. 51, D-80200 Munich: "OpenScape Office LX/MX (de)," pp. 1-10, (version dated: Feb. 29, 2012).
Siemens Enterprise Communications, Hofmannstr. 51, D-80200 Munich: "OpenScape Office MX Offene Schnittstellen," pp. 1-5, (version dated: Feb. 29, 2012).
Siemens Enterprise Communications, Hofmannstr. 51, D-80200 Munich: "Information-OpenScape Office MX und OpenScape Office LX—Die Unified Communications Lösung für kleine und mittlere Unternehmen," Reference No. A31002-P1030-D100-1-29, 12 pages.

* cited by examiner

METHOD AND DEVICE FOR STARTING LIMITED-TIME LICENSES FOR TELECOMMUNICATION SYSTEMS IN A CONTROLLED MANNER

CROSS REFERENCE TO RELATED APPLICATIONS

This application is the United States national phase under 35 U.S.C. §371 of PCT International Patent Application No. PCT/EP2013/000606, filed on Mar. 1, 2013, and claiming priority to PCT International Patent Application No. PCT/EP2012/000958, filed Mar. 2, 2012.

BACKGROUND OF THE INVENTION

1. Field of the Invention

Embodiments relate to controlled starts of limited-time licenses for a telecommunication system with a number of IP terminals, preferably IP telephone devices, connected to it, wherein the licenses acquired by the respective customers for the telecommunication system are downloaded from a central license server on the Internet.

2. Background of the Related Art

A number of methods are already known for activating hardware and software licenses.

As published in EP 1 901 191 A 1, there are technical devices and configurations for which a license is required to use a resource. For example, acquiring a data storage medium including a computer program does not automatically include "permission" to use that computer program. Another common example of the use of licenses is modern communication systems, which are equipped by the manufacturer with a certain number of resources, such as interfaces, channels, services, etc. A certain number of licenses acquired by a user determines the extent to which the resources provided by the manufacturer may be used. The term "resource" designates any technical device, service, function, computer program, or similar item whose use requires permission, i.e., a license.

As in EP 1 901 191 A 1, in the ideal case a manufacturer makes exactly the quantity of resources available to its customers, with an identical number of licenses, as is needed to meet the customer's requirements. In the example of a communication setup, this means that a customer desiring to operate twenty branch offices receives a communication setup with twenty user interfaces, and obviously also a license to operate the twenty user interfaces (and to use 20 channels). However, this example has the disadvantage that, as the customer's need increases, both individual resources (here, physical user interfaces) and the usage licenses required to operate them must be supplied later. This is both logistically and technically disadvantageous. For this reason, technical installations like the communications setup described here are often "oversized" with respect to their resources, meaning that instead of the twenty resources initially required, twenty-four or thirty resources (user connections) are delivered, for example, but only twenty licenses. Then, to expand the telecommunication setup, it is necessary only to acquire additional licenses in order to "activate" the already-supplied additional resources. Another example is computer programs that are distributed with the complete version on a data storage medium or can even be downloaded from the Internet, but which require an "activation code" ("installation key"), and therefore the purchase of a license, in order to use them. Depending upon the activation code (type of license), the customer can use the computer program to a greater or lesser extent. This means that, in this example as well, the resources (here, functions of the computer program) are available (provided) to the customer in advance, but can be used only with a license. In brief, the use of licenses is a tool for permitting or disallowing the use of services, i.e., resources, as needed.

For example, in the case of software products, the tryout phase of a software starts with installing the product, where usually a certain number (e.g., 10-20) of trial copies of this software are available for a limited time, without having to activate the full version on line or telephonically using the serial number as a license key.

As an example of a license-based usage scenario, EP 1 901 191 describes a communication network with three communication nodes, where a license is required to use a channel associated with each communication node (e.g., for each telephone conversation). If thirty terminals are connected to each of the three communication setups, then thirty licenses can be issued for each communication setup, for example. This has the advantage that there are always enough licenses available in each communication setup for the resources (here, channels), even when all users are on the phone, i.e., are using their resources, at the same time. However, such a configuration has the disadvantage for the communication network operator that he must acquire ninety licenses, even though it is highly unlikely that all ninety users will actually be on the phone at the same time and therefore highly likely that acquiring such a large number of licenses is extremely unnecessary. To solve this problem, obviously, the number of licenses for each communication setup can be reduced, by half for example. However, it can then occur that the number of licenses acquired for the communication system may sometimes be insufficient, while at other times the communication system has extra unused licenses. This may cause a function to be unavailable due to "license shortage" at a certain location, even when there are enough licenses overall.

To resolve this "distribution problem," EP 1 901 191 A 1 describes using flexible licenses that can always be applied where they are needed; a "floating licenses" concept is mentioned, and also "central licensing." This is generally done using a central unit, a so-called "licensing server," on which all available "releasable" licenses for the network or installation are placed in advance. As soon as a resource needs to be used (in the preceding example, this means: as soon as a channel needs to be used), that resource or the technical equipment that provides that resource (here, the communication setup), generates a connection to the license server and from it gets an available license for the duration of the use. As soon as the resource is no longer in use, the license is released by means of another data exchange with the license server, so that the license is once again available for other resources to use. This process has the advantage that it is not necessary to maintain the maximum number of licenses in every communication setup in the network for security reasons, i.e., in case exceptionally high utilization of capacity should occur, but instead the available licenses can be used flexibly for various resources or at various locations. The disadvantage to this method, however, is that the network load is higher due to the constant allocation and releasing of licenses. In addition, if the central license server breaks down or cannot be reached, the functionality of the entire network is severely limited.

EP 1 901 191 A 1 also mentions a method for administering licenses, wherein a license is assigned to a resource for the use of that resource and that license is released after the resource has been used. In this method, a first central unit records the number of available licenses, a second unit assigns a recorded available usage license to the resource to be used, and/or a license assigned to the resource by the second unit is recorded in the second unit as available when it ceases to be used. In a synchronization step, the difference between the number of licenses assigned for use since a previous synchronization step and the number released in that period of time from the second unit back to the first unit is repeatedly reported; depending on that difference, the number of available licenses recorded in the first unit is reduced and, inversely, the resulting number of available licenses is reported by the first unit to the second unit and is recorded there as the number of available licenses. This method guarantees that available licenses are actually available in the second unit after completion of the synchronization step, in an arrangement such that, with multiple second units, all applicable licenses are fully available to all of those second units. In this case, should any of the second units fail, all available licenses can still be accessed if the connection to the first unit (central unit) is broken or limited.

BRIEF SUMMARY OF THE INVENTION

Embodiments simplify the licensing of telecommunication systems, such that the customers themselves can establish a limited activation time for licenses beginning at a point in time preset by the customer.

The published patent application EP 1 901 191 A 1 describes the principle of licensing in general. It describes the administration of license data for a telecommunication system that a customer has purchased as a complete unit and can use repeatedly in an internal network.

However, the present invention constitutes a modification or expansion. The present invention describes a leasing arrangement with limited-time licenses for a telecommunication system, which preferably can be started in a targeted manner. The costs involved are always incurred from the moment when the licenses are activated for a telecommunication system. Because it concerns limited-time licenses for a telecommunication system, the start time is relevant for the period of validity.

BRIEF DESCRIPTION OF THE DRAWINGS

The invention is described below in connection with FIGS. 1-5, using the example of a telecommunication system. The figures show.

DETAILED DESCRIPTION OF THE INVENTION

Figure 1:
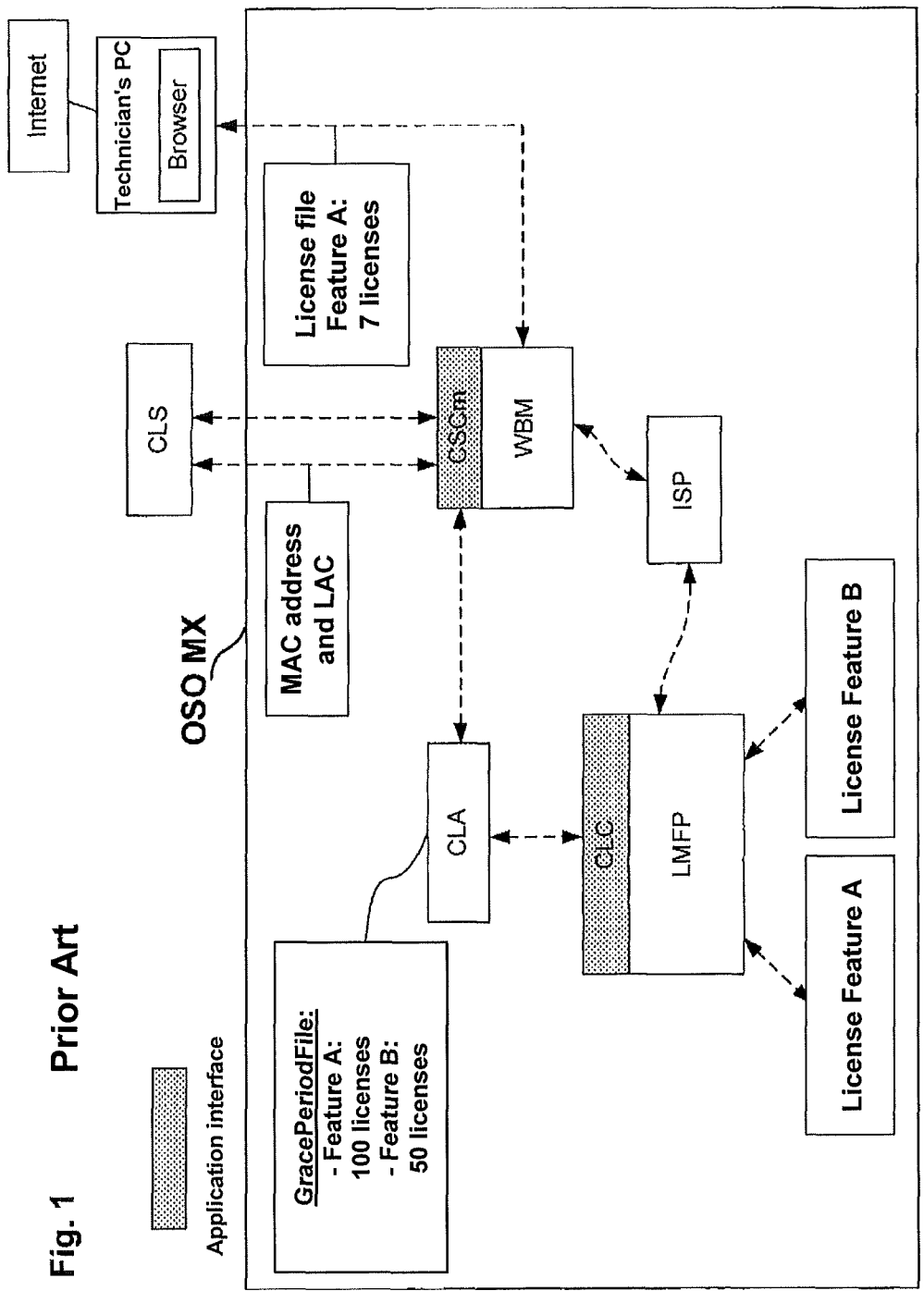
FIG. 1 a block diagram of one example of a telecommunication system described in detail in literature citations [1] to [5] as an "OpenScape Office MX" system, in reference to which the embodiment of the telecommunication system per the invention is explained, FIG. 2 a block diagram of a first embodiment of the telecommunication system per the invention, to which further explanations are added, FIG. 3 a "message chart" shown as a flow diagram with a timed sequence for starting the licensing process, showing the licensing process for the first embodiment of the telecommunication system per the invention as in FIG. 2, FIG. 4 a block diagram of a second embodiment of the telecommunication system per the invention, to which further explanations are added, and FIG. 5 a block diagram of a third embodiment of the telecommunication system per the invention, to which further explanations are added.

Embodiments of the invention are now described with reference to the figures. The embodiment of a telecommunication system shown in FIG. 1 includes the following components, designated by the following references
OSO MX: Telecommunication System The telecommunication system OSO MX, also called a telephone system or telecommunication setup, is described in detail as "OpenScape Office MX" in literature citations [1] to [5] in the literature list on the last page of the description. Functionalities of this telecommunication system OSO MX are licensed. Among other things, licenses are required in this telecommunication system for the system software itself as well as for registering and using IP terminals.
CSCm: "Customer Site Component, Modular"

The component "Customer Site Component, modular" CSCm is the application interface between the "Web-Based Management" WBM and the "Customer License Agent" CLA and the "Central License Server" CLS. This interface is used:
- to establish a connection with the "Central License Server" CLS for "Online Licensing,"
- to download a license file from the "Central License Server" CLS,
- to select the content of the downloaded license file and record it in the "Web-Based Management" WBM.

CLS: "Central License Server"

The "Central License Server" CLS generates license files, and the customer or a technician can access the "Central License Server" CLS from the "Customer Site Component, modular" CSCm via the Internet using a browser (such as Internet Explorer or Mozilla Firefox) installed on a personal computer PC or laptop, for example.
LAC: "License Authorization Code"

The "License Authorization Code" LAC is required in order to download a license file on line from the "Central License Server" CLS.
CLA: "Customer License Agent"

The "Customer License Agent" CLA can manage one or more license files that have been generated by the "Central License Server" and downloaded. The "Customer License Agent" CLA manages license requests and the timed expirations of licenses that applied temporarily to certain features. A "GracePeriodFile" is also offered as a file by the "Customer License Agent" CLA and by the "Central License Server" CLC.
CLC: "Customer License Client"

The "Customer License Client" CLC is a client that is used as the application interface through a library by the "License Management Feature Process" LMFP. Through this application interface, the product can communicate with the "Customer License Agent" CLA that provides the licenses.
"Grace Period": Cost-free Usage Period The file called "GracePeriodFile" contains the features to be licensed for the product with the maximum number of licenses and the maximum cost-free usage duration (the "Grace Period") after the initial activation.

This "GracePeriodFile" is supplied preinstalled by the manufacturer with the telecommunication system OSO MX and is activated in the "Customer License Agent" CLA the first time it is started up.
WBM: "Web-Based Management"

"Web-Based Management" WBM is used to manage the telecommunication system OSO MX. The telecommunication system OSO MX includes a web server with an interface to a browser. Via such a browser, which is connected to the Internet, the telecommunication system OSO MX can be managed.

LMFP: "License Management Feature Process"

The licensing component "License Management Feature Process" LMFP is the interface to all license users in the telecommunication system. The "License Management Feature Process" LMFP ties the "Central License Server" CLS interface to the "Customer License Agent" CLA and supports this central interface.

Licensee Feature

The licensee feature in the telecommunication system OSO MX is a "Comfort User" license, for example. This "Comfort User" license allows an IP terminal, such as an IP phone, to be incorporated into the telecommunication system and used. As an example, 150 of these devices can be operated for 30 days in the "Grace Period." With a regular license file, only the number of IP terminals that the customer has purchased is covered by licenses. A basic license package includes 10 "Comfort User" licenses, for example.

ISP: "Internal System Memory"

Customer-specific and process-specific data are stored in the "Internal System Memory" ISP and can be retrieved from it or entered into it using either the "License Management Feature Process" LMFP or the "Web-Based Management" WBM.

As shown in FIG. 1, the telecommunication system OSO MX is supplied with a "GracePeriodFile." This file contains all license features for this telecommunication system OSO MX with the maximum possible number of licenses. The "Grace Period" is intended to allow for testing of all license features and to span the time period until the customer has downloaded his purchased license file from the "Central License Server" CLS. This "Grace Period" can run only once and lasts for 30 days, for example. Previously, those 30 days were counted as active operating hours. This means that, if the system is switched on, the "Grace Period" time is running, and if the system is switched off, the "Grace Period" time does not run. Here, the end point up to which the "Grace Period" license can be used depends only on the cumulative time during which the operation hour counter is running, so the end point is not predefined.

The first time the telecommunication system OSO MX is switched on in FIG. 1, the component "License Management Feature Process" LMFP creates a connection through the "Central License Server" CLS to the "Customer License Agent" CLA, and the "Grace Period" starts automatically. All licensees on the system can obtain or release the required licenses through the "License Management Feature Process" LMFP. When the "Grace Period" expires after 30 days of operation, the licensees are removed by the "License Management Feature Process" LMFP. New license requests receive negative replies after that.

The arrangement of the telecommunication system OSO MX, described in detail in literature citations [1] to [5], and especially in literature citation [1], as the "OpenScape Office MX" system, is shown in FIG. 1 and summarized below. The telecommunication system OSO MX includes the licensing components on its motherboard. The first time the telecommunication system OSO MX is switched on, licensing starts automatically. A 30-day "Grace Period" is started. This "Grace Period" allows all features that require licenses to be used for 30 days. Before the end of that time, the customer must download his purchased license file via a technician's PC. This purchased license file is shown in FIG. 1 as 7 licenses for feature A in a right-side comment box.

With a basic license, generally the software for a single telecommunication setup is activated only once. In order for telephone calls to be made over this telecommunication system OSO MX, setup using a browser is necessary. The browser is started on a separate connectable technician's PC and can be connected directly to the telecommunication system. This browser is used to start the "Web-Based Management" WBM. The "Web-Based Management" WBM offers menus for configuring and allocating licenses for the telecommunication system OSO MX. The license file (shown in FIG. 1 as 7 licenses for feature A in the right-side comment box) can be downloaded either through a technician's PC or on line from the "Central License Server" CLS via the "Customer Site Component, modular" CSCm to the "Customer License Agent" CLA. Users and trunk lines, among other things, can be set up. If one wishes to use IP terminals such as "OpenStage 80" IP telephones—see [2], page 4—on a long-term basis on the telephone system OSO MX, the customer must purchase licenses for these IP terminals These licenses must be assigned to the designated users of these devices. Without these licenses, only internal telephoning is possible. Only the license allows full use of IP terminals and also other telephony through a private or public telephone switching system.

With the prior art telecommunication system OSO MX described as in FIG. 1, each licensing process must be initiated directly on the telecommunication system OSO MX, wherein the licenses are started when the licensing process takes place.

The embodiments of the telecommunication system OSO MX' per the invention described in FIGS. 2 to 5 have the same basic configuration as the telecommunication system OSO MX described in FIG. 1 with the components described there, wherein the reference designations for all components that perform the same basic functions have the same letters but differ in that a apostrophe is added at the end, so that, for example, CLA' has the same basic function as CLA, WBM' the same basic function as WBM, etc. Therefore, for each description of the components of the embodiments of the invention, only each component's functions that go beyond the components of the telecommunication system OSO MX as described in FIG. 1 are described.

Figure 2:
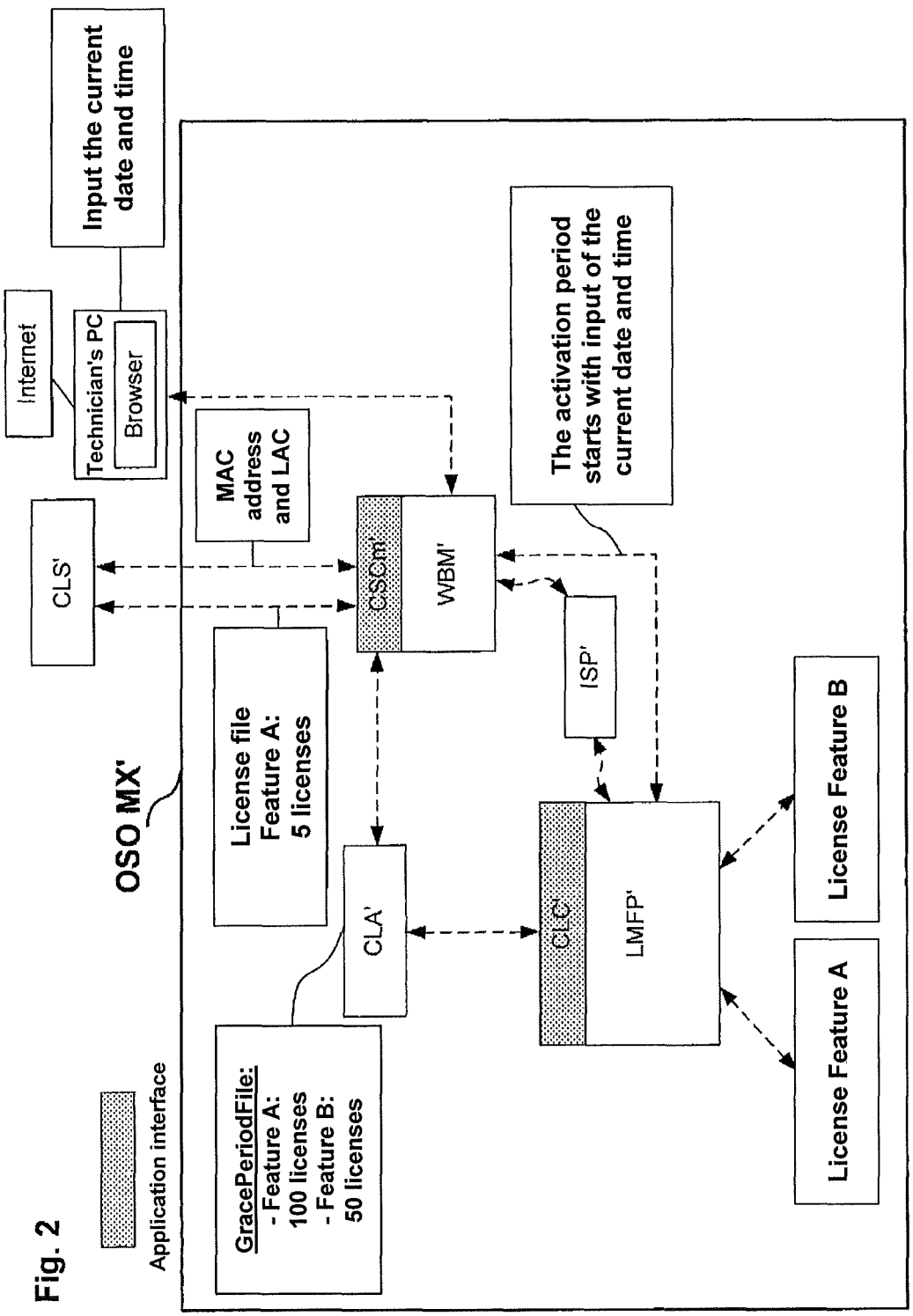
Figure 3:
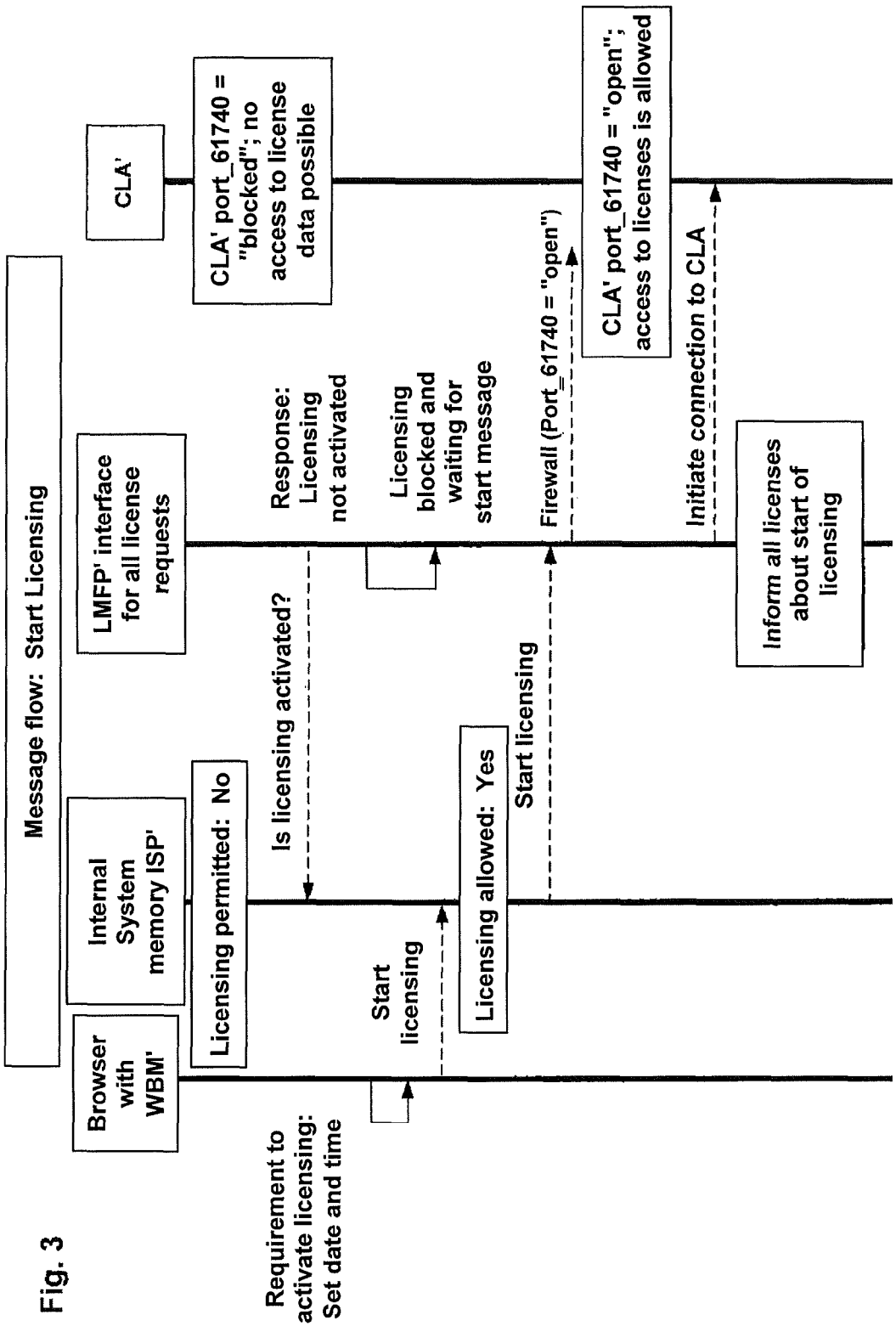

First Embodiment (FIG. 2 with FIG. 3)

FIG. 2 shows a block diagram of the first embodiment of the invention with an improved telecommunication system OSO MX' comprising the connection and use of applications and new features, with further explanations added.

A new licensing functionality, instead of the "Grace Period," is the addition of an "Activation Period" for licensed features. The 30 days (=30×24 hours) used as an example for the "Grace Period" must be changed to 30 actual calendar days. For this reason, the "Grace Period" is renamed as the "Activation Period." This means that, when the activation period is started, the current date is used as the starting value for a licensed feature, e.g., 30 calendar days, and the expiration date, i.e. the end of the period for using the licensed feature, is determined from that.

So that licensing does not start with the first factory test and perhaps already be expired by the time the system is delivered to the customer, the invention includes the possibility of starting licensing on a certain input date. The advantage of this is that telecommunication systems can be configured for operation in advance and then licensed later by the customer.

In this first embodiment of the invention, individual licensed features can be purchased with one limited-time license file (shown in FIG. 1 as a license file with 5 licenses for feature A in a comment box in the center of the diagram), so that the customer can decide for himself when he wants to start using them. This allows an "interactive" transaction.

The functional process of the first embodiment of the invention, shown in FIG. 2, is described below in connection with the flow diagram ("Message Chart") shown in FIG. 3. The licensing component "License Management Feature Process" LMFP' assigns two different features A and B for the licensee, i.e., for the customer, as a basic license during the first startup for the duration of the "Grace Period." As a basic license during the first startup and the "Grace Period," feature A encompasses, for example, up to 100 licenses (e.g., for up to 100 IP terminals), and feature B encompasses up to 50 licenses (e.g., for voicemail on 50 IP terminals), as shown in a left-side comment box in FIG. 2.

The first time that the telecommunication system OS MX' per the invention as in FIG. 2 is switched on, the licensing component "License Management Feature Process" LMFP' is in standby mode. The internal system memory of the "Web-Based Management" WBM' queries and tests whether basic licensing has already been started. In the case shown in the flow diagram (Message Chart) in FIG. 3, licensing has not yet been activated after first startup, and the queried internal system memory of the "Web-Based Management" WBM' gives the response: "Licensing enabled: No." The licensing component "License Management Feature Process" LMFP' is blocked and waits for activation, i.e., a start message from the component "Customer License Agent" CLA'. Therefore, license queries from applications, i.e., from components (e.g., IP terminals, IP telephones, and additional functions such as voicemail) to the licensing component "License Management Feature Process" LMFP' receive negative responses during that time. This prevents the use of unavailable licenses.

Once a date and time are configured via the WBM' by means of a data box in a browser installed, for example, on a personal computer (PC), laptop, or smartphone, the "licensing started" message ("Notification Start Licensing") is sent to the licensing component "License Management Feature Process" LMFP'. The licensing component "License Management Feature Process" LMFP' establishes a connection through the "Customer License Client" CLC to the "Customer License Agent" CLA' and the "Grace Period" is started. From this point on, all licensees on the system can obtain or release the required licenses through the licensing component "License Management Feature Process" LMFP'. When the "Grace Period" expires after 30 calendar days of operation, for example, the licensees are blocked by the licensing component "License Management Feature Process" LMFP'. New license requests receive negative replies after that. So that no other licenses can be loaded on the "Customer License Agent" CLA', the corresponding TCP port (e.g., CLA' port_61740) is blocked, so that only the TCP port (CLA' port_61740) corresponding to the "Customer License Agent" can be addressed. This CLA' port is not opened until licensing is activated. A TCP port is a port according to the Transmission Control Protocol (TCP).

The configuration of the telecommunication system per the invention (also called a telecommunication setup or telephone system) according to the first embodiment of the invention shown in FIG. 2 is designed for small and medium-sized businesses and has the licensing components on the motherboard, like the telecommunication system OSO MX shown in FIG. 1. However, the first time the customer starts up the telecommunication system, licensing does not start yet. However, in order for the customer to make phone calls using this system, the telecommunication system must be set up. The Windows application "ManagerE," for example, can be used to configure the telecommunication system.

However, because all terminals and trunk lines in this telecommunication system example require a license, this configuration is still not complete. It supports only internal telephony. This functional configuration can be used, for instance, by the retailer to configure the telecommunication before it is delivered to the customer.

Full use of the IP terminals and trunkline must be obtained by licensing. A browser, preferably installed on a technician's PC, is used to start the "Web-Based Management" WBM'. Here one is first required to enter the date and time for the respective licensing feature A or B. These data are used to initiate licensing. The users connected to the telecommunication system OSO MX' (e.g., IP terminals) can then have their designated licenses assigned using a licensing dialog box. This involves a one-time license to use the device and then multiple licenses for using additional features.

When licensing is activated, an "Activation Period" is started that supports the full licensing scope for, e.g., 30 calendar days. Within these 30 calendar days, purchased licenses must be downloaded into the system. As soon as a purchased license file is loaded, it supersedes the "Activation Period". The purchased license file is generated on the "Central License Server" CLS' and can be loaded onto the system through a direct online connection via the "Web-Based Management" WBM' with the "Customer Site Component, modular" CSCm'. A second possibility is direct access to the CLS' through a browser. In this way, a license file can be loaded first through the browser onto a PC and then from there to the telecommunication system OSO MX'.

In the telecommunication system OSO MX' (also called a telephone system) as in FIG. 2, the software is preinstalled and activation is controlled by entry of the date.

In the flow diagram in FIG. 3, the software components needed to activate licensing are specified. After the first system startup, the licensing component "License Management Feature Process" LMFP' sends a request to the "Internal System Memory" ISP', in which the customer-specific and process-specific data are stored, for example, in an EEPROM memory, asking whether licensing has already been activated.

Because it is the first system startup and activation through the "Web-Based Management" WBM' has not yet been initiated, licensing is still blocked. The licensing component "License Management Feature Process" LMFP' therefore goes into standby mode and waits for an activation message from the "Web-Based Management" WBM'. All licensees must request their licenses through the licensing component "License Management Feature Process" LMFP'. Because it is in standby mode, all license requests are refused. The "Customer License Agent" CLA' manages the license file containing the license data. So that no components can access this "Customer License Agent" CLA', even through a network connection, the corresponding TCP port (e.g., CLA' port_61740) is blocked in the firewall.

As soon as the customer or technician enters the license activation data on the "Web-Based Management" WBM', a message from the "Web-Based Management" WBM' is sent to the "Internal System Memory" ISP', in which customer-specific and process-specific data are stored, for example on an EEPROM memory. This component stores the activation and informs the licensing component "License Management Feature Process" LMFP'.

The "License Management Feature Process" LMFP' then opens the corresponding TCP port for the "Customer License Agent" CLA' in the firewall and establishes a connection to the "Customer License Agent" CLA'. Through this connection, all licensees can now obtain and release licenses.

Figure 4:
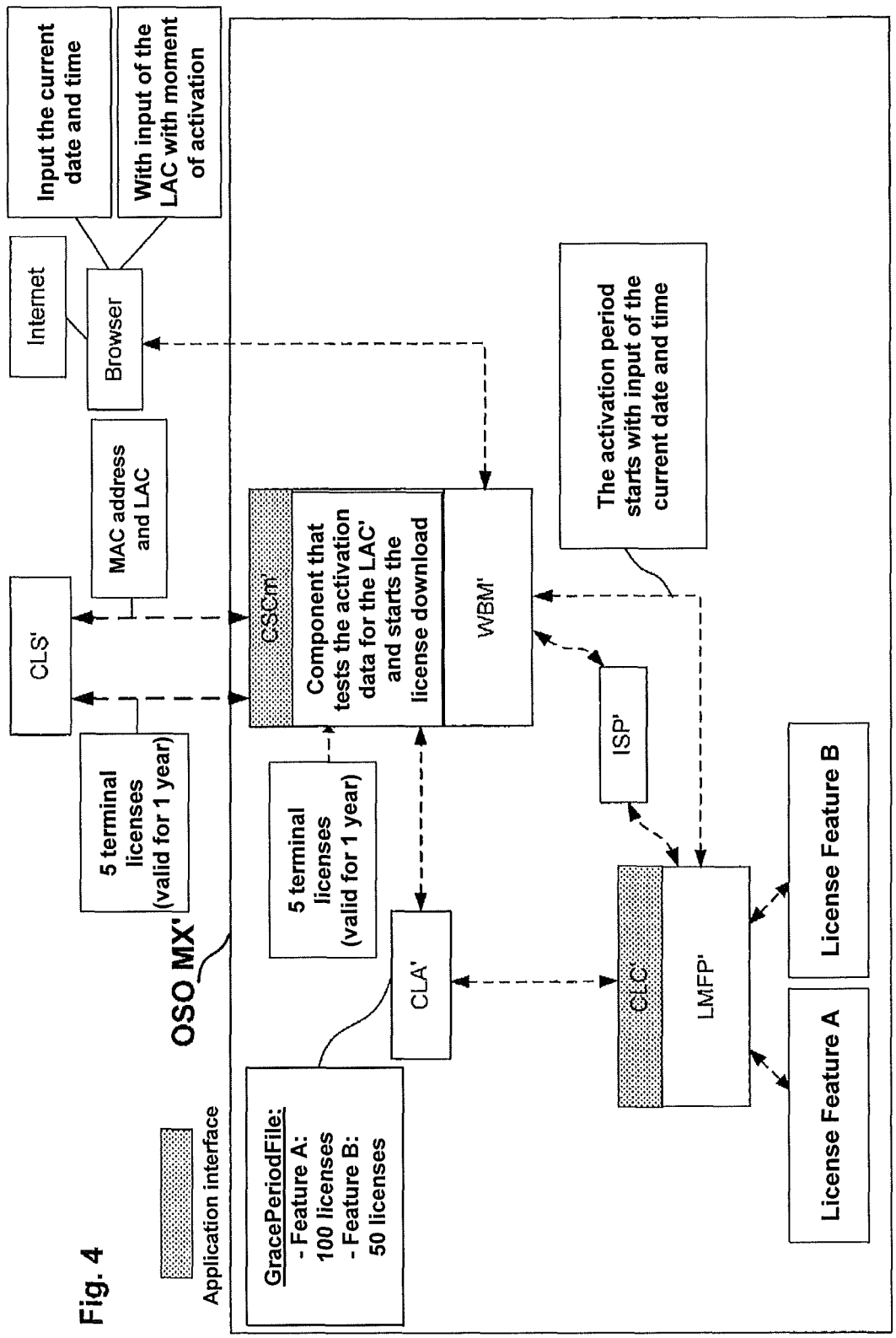

A second embodiment of the telecommunication system OSO MX' per the invention, shown in FIG. 4, goes beyond the first embodiment of the invention shown in FIG. 2 with an additional component that tests for the "License Authorization Code" LAC and controls online activation on an individual basis with the relevant activation data.

A "License Authorization Code" LAC is generally required for online licensing. The unique factor here is that a code with a predefined point in time is stored. Online licensing is started in accordance with the configured point in time. An explanation is provided below of how a possible "interactive transaction" can be achieved using such a "License Authorization Code" LAC, for example. Here the other components function as described in FIGS. 1-3, with any differences indicated in additional comment boxes near the respective components.

A licensed telecommunication system can be expanded with licenses purchased later, and here a license expansion is shown as the aforementioned on-line licensing. Here a customer who has purchased additional licenses receives a "License Authorization Code" LAC for license activation. This "License Authorization Code" LAC contains all of the licenses with a validity period, such as one year. On-line licensing is started via the "Web-Based Management" WBM. Through it, the telecommunication system sends the Mac addresses and "License Authorization Codes" LAC to the "Central License Server" CLS'. The "Central License Server" CLS' generates a new license file from that data and any other existing license file. This new license file is downloaded into the telecommunication system as an encoded license file. The validity period for the activated licenses begins when the license file is downloaded. According to the invention, the customer must be actively registered through the WMB on the "Central License Server" CLS'.

The time control for the second embodiment takes place as follows. With the "Web-Based Management" WBM, a table can be configured in which the start time for the license package and its respective "License Authorization Codes" LAC are stored. Individual license packages could be, for example:

a number of limited-time terminal licenses, e.g., for one year, and an additional quantity of trunk line licenses.

This allows a number of temporary employees to be supported with temporary access to a license, such as project workers or Call Center employees. This new system component in "Customer Site Component, modular" CSCm' tests the activation data in cycles. If a configured date is entered, the telecommunication system connects with the "Central License Server" CLS' and sends the appropriate MAC address and "License Authorization Codes" LAC. The new license file generated by the "Central License Server" CLS' is downloaded and activated.

The process described here is explained in FIG. 4 with respect to the block diagram for the first embodiment as in FIG. 2 with additional comments for some components.

It offers the advantage that the telecommunication system can be preconfigured once on one day, and the licenses can be started later at a preconfigured point in time.

Figure 5:
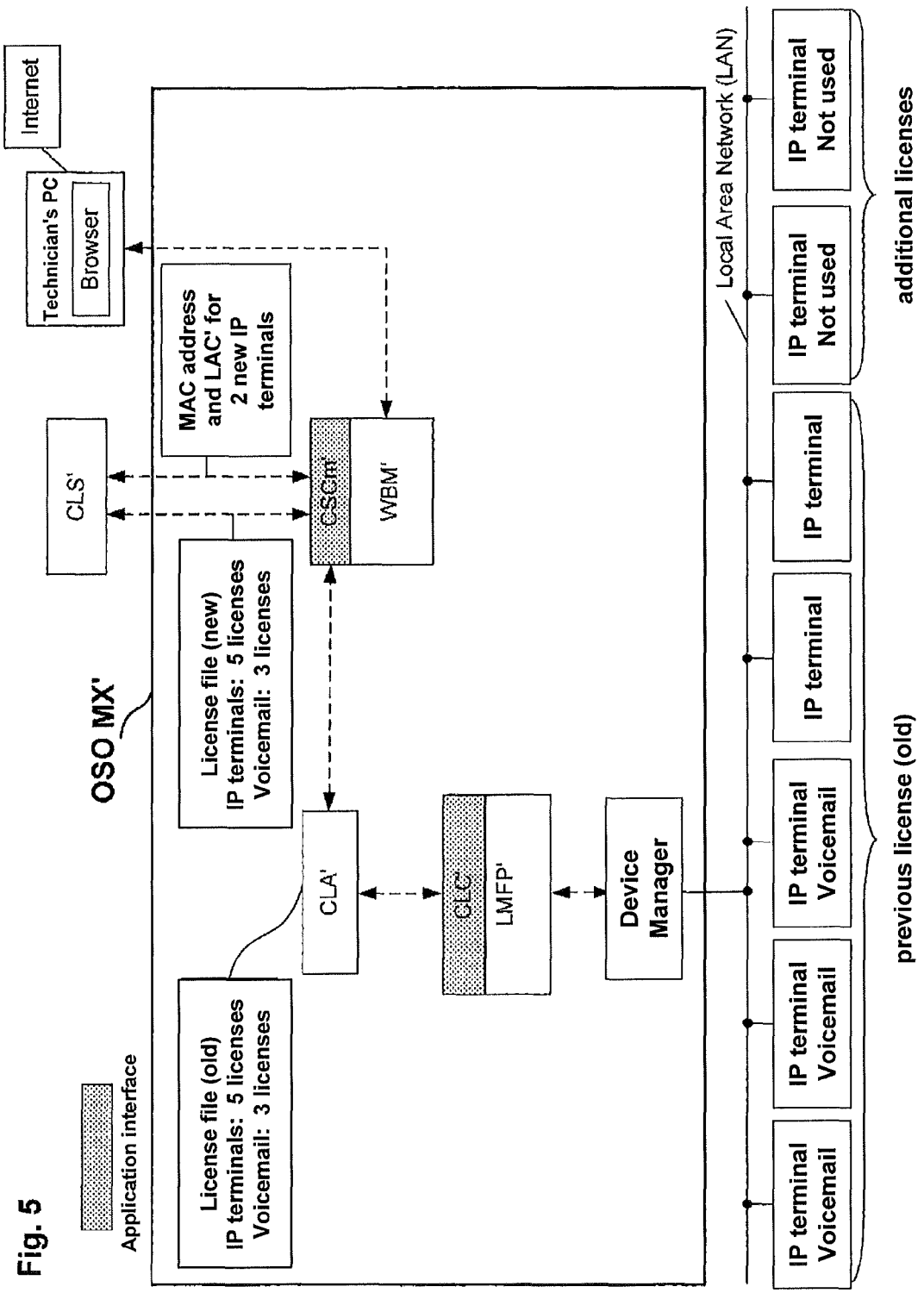

A third embodiment of the telecommunication system OSO MX' per the invention, shown in FIG. 5, goes beyond the first embodiment of the invention shown in FIG. 2 with an additional two groups of IP terminals that are connected to the licensing component "License Management Feature Process" LMFP' through a Local Area Network (LAN).

The first group consists of five IP terminals, each with voicemail (also called an answering machine), that are designated with the information "previous license" and which—as indicated in the comment box with "license file (old)"—are licensed with a license for a group of five IP terminals through "license file (old)," wherein three of the five IP terminals have the additional feature of "Voicemail" under "license file (old) ." The second group consists of two newly connected IP terminals, designated with the information "additional license" and also labeled "not in use."

By means of a licensing change, the new license file for the two additional IP terminals in the second group has been downloaded on line, and the previous license file—designated in the comment box as "license file (old)"—should be expanded as of the moment of activation. From the moment of activation, the telecommunication system OSO MX' now has a license for all seven IP terminals from the first and second groups together, and the additional feature of "Voicemail" is licensed for only three IP terminals.

This third embodiment shows how additional IP terminals can easily be connected by the customer as licensee on line by later expansion of the telecommunication system OSO MX' per the invention by simply activating additional licenses, without a technician having to make hardware changes to the telecommunication system OSO MX'.

In one modification to this third embodiment, corresponding to the second embodiment shown in FIG. 4, at the start of on-line licensing the "Web-Based Management" WBM' sends the MAC address of the telecommunication system OSO MX' and the "License Authorization Code" LAC to the "Central License Server" CLS', whereupon the "Central License Server" CLS' downloads the additional license file for the two additional IP terminals in the second group into the telecommunication system OSO MX' as an encoded license file; the new license file "License file (new)" is then generated from this encoded license file and the previous license file "License file (old)," and the validity time period for the licenses activated, for example, by downloading the encoded license file for all seven IP terminals begins with that moment of activation.

LITERATURE LIST

[1]: Siemens Enterprise Communications, Hofmannstr. 51, D-80200 Munich, May 2010, "Getting Started, OpenScape Office MX, 2nd Edition," Reference No.; A31003-P1020-G 100-2-31, 4 pages.

[2]: Siemens Enterprise Communications, Hofmannstr. 51, D-80200 Munich: "OpenScape Office MX (de)," pages 1-5, (version dated: Feb. 29, 2012)

[3]: Siemens Enterprise Communications, Hofmannstr. 51, D-80200 Munich: "OpenScape Office LX/MX (de)," pages 1-10, (version dated: Feb. 29, 2012)

[4]: Siemens Enterprise Communications, Hofmannstr. 51, D-80200 Munich: "OpenScape Office MX Offene Schnittstellen," pages 1-5, (version dated: Feb. 29, 2012)

[5]: Siemens Enterprise Communications, Hofmannstr. 51, D-80200 Munich: "Information-OpenScape Office MX und OpenScape Office LX —Die Unified Communications Lösung für kleine und mittlere Unternehmen," Reference No.: A31002-P1030-D100-1-29, 12 pages

We claim:

1. A method for controlled starting of limited-time licenses for a telecommunication system with a number of applications connected to it, the telecommunication system comprising non-transitory memory and being connectable to multiple terminal devices, wherein licenses acquired by customers for the telecommunication system are downloaded from a Central License Server via the Internet, the method comprising:

configuring a date, time and an activation period via a dialog box communicated in a browser using a Web-Based Management component of the telecommunication system connected to the Internet a first time the telecommunication system is switched on for activation;

establishing a maximum permitted usage time for cost-free use of the license by the telecommunication system, and when the maximum permitted usage time expires, discontinuing the use of those licenses for which no usage rights have been acquired;

expanding the telecommunication system with additional licenses purchased later on-line, such that a customer who has purchased the additional licenses receives a "License Authorization Code" for license activation, which gives the licenses a validity period;

starting on-line licensing through "Web-Based Management";

at the start of the on-line licensing, sending a Media Access Control (MAC) address of the telecommunication system and the "License Authorization Code" to the "Central License Server" using "Web-Based Management,"

downloading, via the "Central License Server" a new license file as an encoded license file into the telecommunication system for storage in non-transitory memory, generating a new license file from the encoded license file and any previous license file, and beginning the validity time period for the licenses activated by downloading the encoded license file.

2. The method of claim 1, further comprising configuring a table in the "Web-Based Management" for time-based control, in which the start time of a license package and its related "License Authorization Code" is stored, with individual license packages having at least one of a number of limited-time terminal licenses and an additional number of limited licenses for trunk lines.

3. The method of claim 1, further comprising testing activation data in cycles, and, when a configured date is entered, connecting the telecommunication system with the "Central License Server", which sends an appropriate MAC address and the "License Authorization Code", so that the newly generated license file is downloaded from the "Central License Server" and activated.

4. The method of claim 1, wherein the maximum permitted usage time is designated in calendar days.

5. The method of claim 1, wherein the maximum permitted usage time is 30 working days.

6. The method of claim 1, wherein the terminal devices are IP telephone devices.

7. A telecommunications system comprising:

a motherboard having licensing components, the licensing components comprising internal system non-transitory memory and a Web-Based Management Component configured to communicate with a central license server;

the system configured to perform a method comprising:

configuring a date, time and an activation period via the Web-Based Management component a first time the telecommunication system is switched on for activation;

establishing a maximum permitted usage time for cost-free use of the license by the telecommunication system, and discontinuing use of those licenses for which no usage rights have been acquired when the maximum permitted usage time expires by the telecommunication system;

starting on-line licensing via the Web-Based Management component;

at the start of the on-line licensing, sending a Media Access Control (MAC) address of the telecommunication system and a License Authorization Code to the Central License Server via the Web-Based Management component;

downloading a new license file as an encoded license file into the telecommunication system from the Central License Server, generating a new license file from the encoded license file and any previous license file to store in the non-transitory memory, and beginning the validity time period for the licenses activated by downloading of the encoded license file.

8. The telecommunication system of claim 7, wherein the maximum permitted usage time is designated in calendar days.

9. The telecommunication system of claim 7, wherein the maximum permitted usage time is 30 working days.

10. The telecommunication system of claim 7, wherein the licensing components of the motherboard also comprise a customer license agent configured to manage at least one license file containing license data.

11. The telecommunication system of claim 10, wherein the licensing components also comprises a license management feature process component that is configured to open a port for the customer license agent in a firewall and is configured to establish a connection to the customer license agent after determining that activation of the licensing has begun.

12. The telecommunication system of claim 11, wherein the telecommunication system is configured to test for the License Authorization Code and control online activation on an individual customer basis based on license activation data stored in non-transitory memory of the telecommunication system.

13. The telecommunication system of claim 12, wherein the license activation data comprises a table in which a start time of a license package and its related License Authorization Code is stored.

14. The telecommunication system of claim 12, wherein the license package has at least one of a number of limited-time terminal licenses and an additional number of limited licenses for trunk lines.

15. A telecommunication system comprising:

at least one motherboard having licensing components, the licensing components comprising internal system non-transitory memory and a license management mechanism configured to communicate with the internal system non-transitory memory;

the telecommunication system being connectable to a plurality of terminal devices and a plurality of trunk lines;

the telecommunication system configured to perform a method comprising:

receiving a purchased license file;

activating the license upon receipt of a date;

the license management mechanism receiving an activation message from the internal system non-transitory memory after the license is activated;

the license management mechanism opening a port for a customer license agent to establish a connection to the customer license agent so that licenses for the terminal devices and the trunk lines are obtainable and releaseable; and the telecommunication system expanding with subsequently purchased licenses for at least one of the terminal devices and the trunk lines by an expansion process comprising:

sending at least one media access control (MAC) address and at least one license authorization code to a central license server;

downloading a new license file generated from the at least one MAC address and at least one authorization code sent to the central license server as an encoded license file; and starting a validity time period for the encoded license file when the encoded license file is downloaded.

16. The telecommunication system of claim 15, wherein the method also comprises:

monitoring licensing for the terminal device and the trunk lines.

17. The telecommunication system of claim 16, wherein the telecommunication system is configured to create and store a table having start times for at least one license package and license authorization codes for terminal device licenses and trunk line licenses for terminal devices and trunk lines connected to the telecommunication system.

18. The telecommunication system of claim 16, wherein the telecommunication system is configured to test license activation data stored in non-transitory memory of the telecommunication system.

19. The telecommunication system of claim 18, wherein the telecommunication system is configured to communicate with the central license server to send a MAC address and a license authorization code to the central license server in response to detecting a configuration date from a test of the license activation data to initiate a download and activation of a new license file the central license server is to generate from that MAC address and license authorization code.

20. The telecommunication system of claim 19, wherein the terminal devices comprise IP telephones.

\* \* \* \* \*